Feb. 4, 1958
E. J. CAMPBELL
2,822,503
STABILIZED TV SYSTEM
Filed June 1, 1953
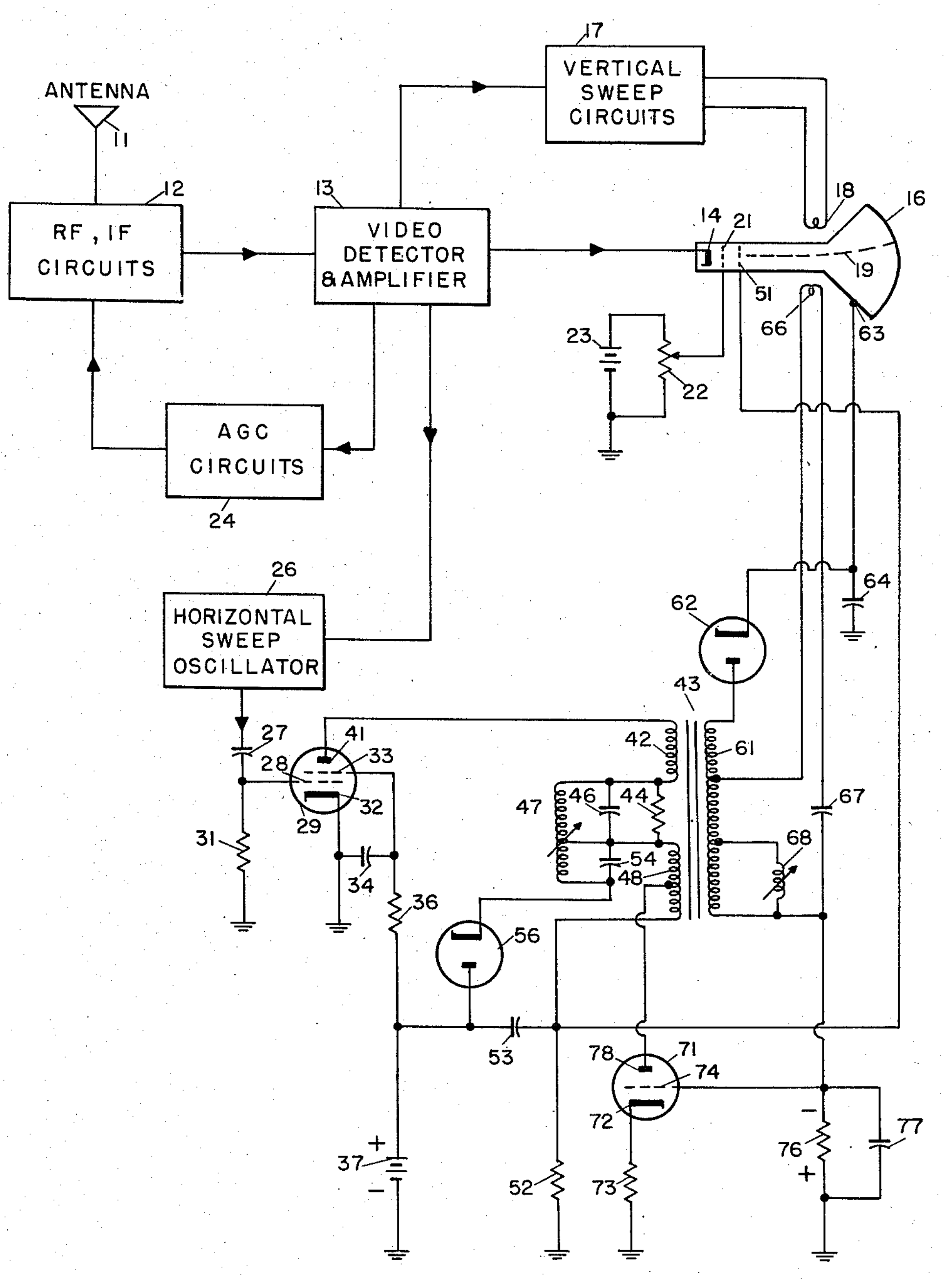
INVENTOR.
EDWARD J. CAMPBELL
BY Darby & Darby
ATTORNEYS 2,822,503

STABILIZED TV SYSTEM

Edward J. Campbell, Clifton, N. J., assignor to Allen B. Du Mont Laboratories, Inc., Clifton, N. J., a corporation of Delaware Application June 1, 1953, Serial No. 358,876
5 Claims. (Cl. 315—27)

This invention relates to television circuits and particularly to horizontal deflection circuits of the type which provide deflection signals and accelerating voltage for a cathode ray picture tube.

In television horizontal deflection circuits, a horizontal output transformer customarily is provided for coupling the deflection signals to a horizontal deflection coil placed near a cathode ray picture tube. The horizontal output transformer customarily contains a high voltage winding in which a high voltage is developed due to the A.-C. nature of the horizontal deflection signals. The high voltage is rectified to obtain a D.-C. voltage of positive polarity, for the accelerating anode of the cathode ray picture tube. The prior art circuit suffers the drawback of being unstable with respect to changes in the accelerating anode current of the picture tube. For example, if the accelerating anode current becomes changed due to a change in picture brightness the "Q" or electrical efficiency of the transformer changes, resulting in undesirable changes in picture size in the horizontal dimension, and sometimes resulting in undesired changes in linearity of the picture displayed on the picture tube.

Objects of this invention are to provide a stabilized TV deflection system which overcomes these drawbacks of the prior art circuits, and to provide a deflection circuit for television which is stabilized with respect to the accelerating anode current of the picture tube. Other objects will be apparent.

Briefly, the objects are accomplished in accordance with the invention by providing an electrical load in a TV horizontal deflection circuit to maintain the electrical "Q" of the horizontal output transformer, substantially constant. In the preferred embodiment the electrical loading of the output transformer is stabilized by means of a loading tube, the load of which varies inversely with the transformer loading caused by the accelerating anode of the picture tube.

The single figure of the drawing is an electrical diagram, partially schematic and partially in block form, of a preferred embodiment of the invention.

A TV receiving antenna 11 is connected to radio frequency and intermediate frequency circuits 12 of a television receiver, which circuits in turn are connected to video detector and amplifier circuits 13. The video circuits are connected to a control electrode 14, (shown herein as a cathode) of a television picture tube 16. Signals from the video detector and amplifier circuits 13 are also connected to vertical sweep circuits 17, which are connected to actuate a vertical deflection coil 18 positioned near the picture tube 16 to deflect the electron beam 19 therein. The control grid 21 of the picture tube 16 is shown to be connected to a source of variable bias voltage comprising a potentiometer 22 and a source 23 of a voltage, the variable bias source being electrically grounded.

Automatic gain control circuits 24 may be utilized in the normal manner if desired to provide stabilized gain of the radio frequency and intermediate frequency circuits 12, the AGC circuits 24 being connected to be controlled by signals from the video detector and amplifier circuits 13.

The video detector and amplifier circuits 13 also are connected to a horizontal sweep oscillator 26, the output of which is connected through a coupling condenser 27 to a control grid 28 of a horizontal output amplifier tube 29, the grid 28 being returned to electrical ground through a resistance 31. A cathode 32 of the tube 29 is connected to electrical ground and a screen grid 33 is shown as being by-passed to ground through a condenser 34 and connected through a voltage dropping resistance 36 to a positive-polarity terminal of a source 37 of voltage, the remaining terminal of which is grounded.

The output anode 41 of the amplifier tube 29 is connected to a portion 42 of a primary winding of a horizontal output transformer 43. The remaining end of this primary portion 42 is connected through a parallel combination of a resistance 44, a capacitance 46, and part of a variable linearity control inductance 47, to a remaining portion 48 of the primary winding. The other end of this latter primary portion 48 is connected to a first anode 51 in the picture tube 16, and also through a resistance 52 to electrical ground and a capacitance 53 to the source 37 of voltage. A capacitance 54 is connected across the remaining portion of the linearity control inductance 47, the end of which is connected through a diode damper or booster voltage tube 56 to the source 37 of voltage.

The transformer 43 is provided with a secondary winding 61, one end of which is connected through a high voltage rectifier 62 to an accelerating anode 63 in the picture tube 16. The accelerating anode 63 is by-passed to electrical ground by means of a filter condenser 64. A horizontal deflection coil 66 is connected, through a coupling condenser 67, across a portion of the secondary winding 61. An adjustable width control inductance 68 is connected across a portion of the secondary winding 61.

A loading tube 71 has a cathode 72 connected to electrical ground through a resistance 73, a control grid 74 connected to electrical ground through a biasing resistance 76 and an anode 78 connected to the primary winding 42, 48 of the horizontal output transformer 43, at or near the lower end thereof. A filter capacitance 77 is connected across the biasing resistance 76. The control grid 74 also is connected to the lower end of the secondary winding 61 of the horizontal output transformer 43.

The operation is as follows:

When the television picture is of maximum brightness, the current drawn by the accelerating anode 63 from the secondary winding 61 of the transformer 43, will be of a maximum value, since under this condition the electron beam 19 will be of maximum intensity. Thus, the accelerating anode 63 provides maximum loading on the transformer 43, under the aforementioned condition of maximum electron beam current. The current drawn by the accelerating anode 63 flows through the bias control resistance 76 and through the secondary winding 61. When the anode current is at a maximum value, the biasing voltage applied to the control grid 74 of the control tube 71 by the biasing resistance 76, will be of maximum negative-polarity value.

Preferably, the characteristics of the control tube 71 and the values of the biasing resistances 73 and 76, are such that the control tube 71 will be at or near its plate current cut-off point when the accelerating anode 63 current through the bias resistance 76 is maximum. When, due to a change in brightness of the picture on the picture tube 16, or due to other circumstances, the current to the accelerating anode 63 which flows through the biasing resistance 76, is reduced, the loading on the transformer 43 due to the accelerating anode 63, is reduced. However, due to the automatically reduced negative bias at the biasing resistance 76, the control tube 71 will be rendered relatively more conductive, whereupon it will draw more plate current from the primary winding 48 of the transformer 43.

The circuit preferably is adjusted so that the changing load provided by the control tube 71 varies directly inversely with respect to any change in load of the transformer 43 caused by changes in current drawn by the accelerating anode 63 in the picture tube 16. Thus, the combined electrical loading power consumed by the accelerating anode 63 and control tube 71, remains substantially constant, whereupon the loading on the output transformer 43 remains substantially constant. The result is substantially constant electrical "Q" of the output transformer, which in turn insures stability of the size and linearity of the picture on the viewing tube 16.

The filter condenser 77 connected across the biasing resistance 76, stabilizes the control circuit with respect to any short time-duration current fluctuations of the accelerating anode 63.

The anode 78 of the control tube 71 may be connected to any winding on the transformer 43 which will provide a suitable loading effect.

In the preferred embodiment shown and described, the control tube 71 provides a controlled D.-C. current load on a winding of the transformer 43 which counteracts and opposes any tendency of change in D.-C. loading of the transformer due to changing D.-C. current drawn from a winding by the accelerating anode 63. The A.-C. signals in the transformer are substantially unaffected by the automatic stabilizing process.

While a preferred embodiment of the invention has been shown and described, various modifications thereof will appear to those skilled in the art but which will fall within the scope of invention as defined in the following claims.

What is claimed is:

1. A stabilized deflection system for television, comprising a transformer having a primary winding and a secondary winding, said secondary winding comprising a plurality of terminals including a terminal at each end of said winding, a source of D.-C. voltage connected to said primary winding, a picture display device having an accelerating anode and a deflection coil, said coil connected to one pair of terminals of said secondary winding, a rectifier connected between a third terminal of said secondary winding and said anode, an impedance connected between one of said terminals other than said third terminal and electrical ground, and a control tube having an anode connected directly to said primary winding, a cathode connected to electrical ground, and a control grid connected to the junction of said impedance and said secondary winding.

2. The system in accordance with claim 1, including a source of bias connected to said control grid whereby said grid draws substantially zero current when said accelerating anode draws maximum current.

3. A stabilized television deflection system comprising a transformer, a source of deflection signals connected to a first winding of said transformer, a picture display tube having an accelerating anode, said anode connected to a second winding of said transformer and comprising part of a current carrying loop defined by said accelerating anode and said second winding, a stabilizing current control device comprising an amplifier tube having a control grid and an anode, said amplifier tube anode connected directly to a third winding of said transformer, said control grid connected to said loop and energized by current flowing therethrough, said grid controlling current flowing through said amplifier tube inversely with respect to the amount of current drawn by said accelerating anode.

4. The system in accordance with claim 3, further comprising an impedance is connected in series with said current carrying loop to bias said control electrode.

5. A stabilized electrical system comprising a deflection transformer; a source of deflection signals connected to a winding of said transformer; a rectifier circuit comprising a rectifier tube connected to a second winding of said transformer; a picture display device having an anode connected to said rectifier and supplied with current therefrom, said current being variable with picture brightness; a load-control device comprising an amplifier tube having an anode connected to a third winding of said transformer; and means connected between said anode of said picture display device and said load-control device, whereby the loading effect of said load-control device changes inversely with respect to variations in the current supplied by said rectifier, said means comprising a control grid in said amplifier tube and a connection between said control grid and said rectifier circuit to control the impedance of said rectifier tube.

References Cited in the file of this patent

UNITED STATES PATENTS

| | | |
|---|---|---|
| 2,490,743 | Sziklai | Dec. 6, 1949 |
| 2,536,857 | Schade | Jan. 2, 1951 |
| 2,657,333 | Haantjes et al. | Oct. 27, 1953 |
| 2,679,550 | Parker | May 25, 1954 |
| 2,697,798 | Schlesinger | Dec. 21, 1954 |
| 2,726,340 | Nelson | Dec. 6, 1955 |